July 11, 1967 — T. ONGARO — 3,330,159

DYNAMIC TESTING SYSTEM

Original Filed Oct. 11, 1960 — 9 Sheets-Sheet 1

INVENTOR.
THEODORE ONGARO

BY *Schmieding and Fultz*

ATTORNEYS

July 11, 1967 T. ONGARO 3,330,159
DYNAMIC TESTING SYSTEM
Original Filed Oct. 11, 1960 9 Sheets-Sheet 3

INVENTOR.
THEODORE ONGARO
BY
Schmieding and Fultz
ATTORNEYS

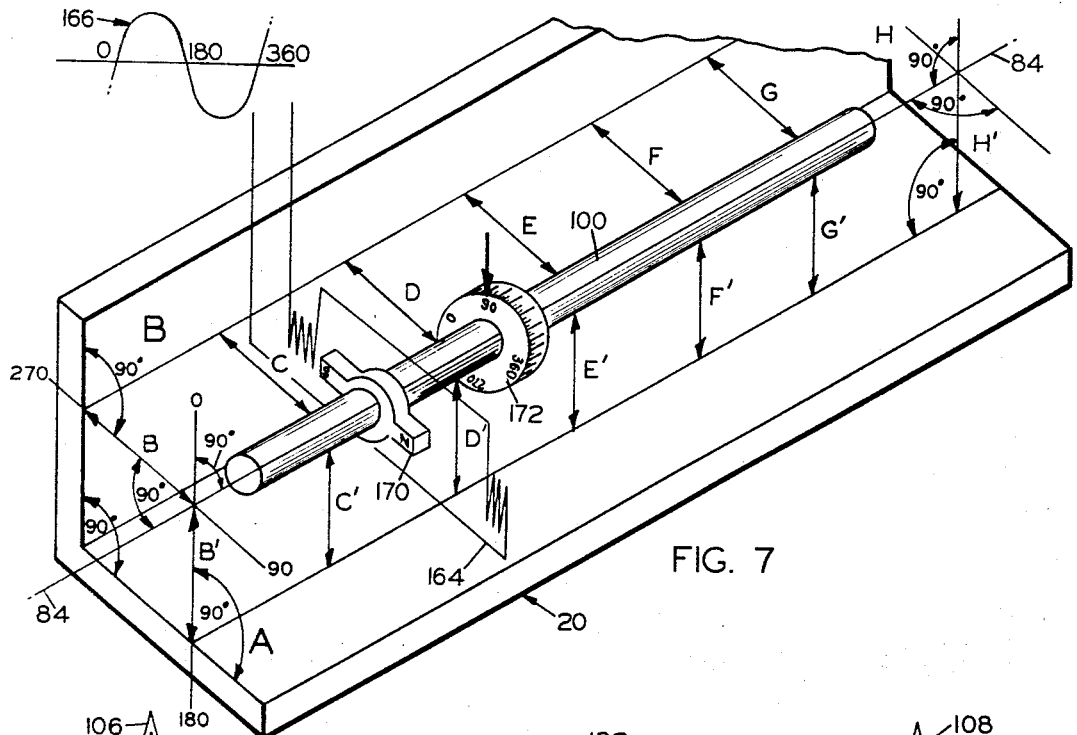
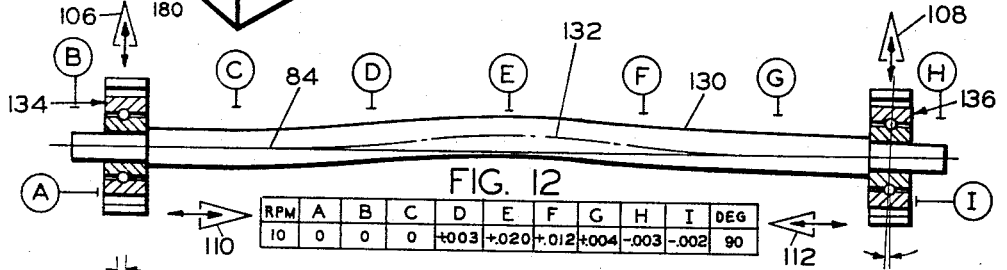
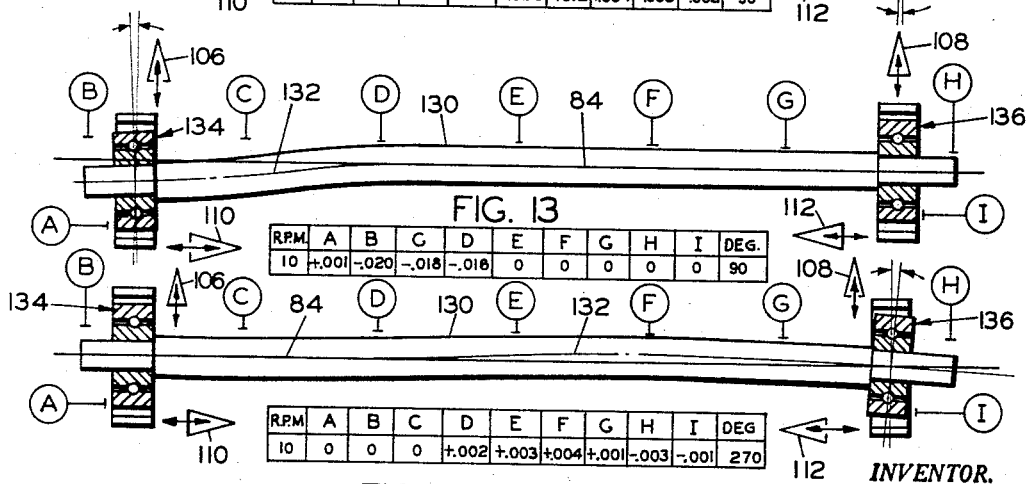
FIG. 7
FIG. 12
FIG. 13
FIG. 14
INVENTOR.
THEODORE ONGARO
BY
Schmieding and Fultz
ATTORNEYS July 11, 1967 T. ONGARO 3,330,159

DYNAMIC TESTING SYSTEM

Original Filed Oct. 11, 1960 9 Sheets-Sheet 6

| R.P.M. | A | B | C | D | E | F | G | H | I | DEG. |
|---|---|---|---|---|---|---|---|---|---|---|
| 10 | -.010 | ✓ | ✓ | ✓ | ✓ | ✓ | ✓ | ✓ | ✓ | 60 |

| R.P.M. | A | B | C | D | E | F | G | H | I | DEG. |
|---|---|---|---|---|---|---|---|---|---|---|
| 10 | ✓ | ✓ | -.005 | -.020 | -.035 | -.050 | -.065 | -.090 | -.020 | 150 |

| R.P.M. | A | B | C | D | E | F | G | H | I | DEG. |
|---|---|---|---|---|---|---|---|---|---|---|
| 10 | +.005 | +.005 | -.005 | -.020 | -.035 | -.050 | -.065 | -.090 | -.020 | 150 |

| RPM | A | B | C | D | E | F | G | H | I | DEG. |
|---|---|---|---|---|---|---|---|---|---|---|
| 10 | ✓ | +.002 | -.004 | -.010 | -.010 | -.008 | -.006 | +.002 | ✓ | 150 |

INVENTOR.
THEODORE ONGARO

BY
*Schmieding and Fultz*
ATTORNEYS

INVENTOR.
THEODORE ONGARO

INVENTOR.
THEODORE ONGARO
BY
Schmieding and Fultz
ATTORNEYS

United States Patent Office 3,330,159
Patented July 11, 1967

3,330,159
DYNAMIC TESTING SYSTEM
Theodore Ongaro, Columbus, Ohio, assignor to Ongaro Dynamic Industries, Inc., Columbus, Ohio
Continuation of application Ser. No. 61,970, Oct. 11, 1960. This application Jan. 17, 1964, Ser. No. 339,071
23 Claims. (Cl. 73—432)

This application is a continuation of application Ser. No. 61,970 filed Oct. 11, 1960, for Dynamic Testing Apparatus which application is now abandoned.

This invention relates generally to machines and methods for testing rotors to determine physical changes that occur when the rotor is operated at high speeds and relates specifically to the graphic display of attitudes of a rotor in a dynamic state in its natural environment.

With the ever increasing demand for high performance power generating machines, high speed rotary machinery, such as the airborne turbojet engine, is finding greater use. In the past, high speed machinery was only a laboratory device and up to the last decade or so the types used in industry could be classified as high speed machinery, such as steam turbines, high speed grinders and very small electric motors, used in internal grinders and guidance gyros. Most of these machines are associated with modest temperatures.

In slow speed machinery (under 10,000 r.p.m.) mechanical stability can be assured when good engineering practice is used in design and when correct balancing techniques are adhered to. Machinery of this type behaves in a reliable, understandable pattern coupled with long life.

During the last ten years demand has accelerated the development of the high speed airborne turbojet engine. The temperatures encountered are severe, in addition to the larger forces, which in turn impose serious problems. The design and methods used along with the existing forces and high temperatures have created an unpredictable pattern of reliability.

Some of the major problems encountered in these airborne turbojet engines are the loss of power due to the following conditions: (a) Bearing labyrinth seal failures causing a rise in bearing temperatures; (b) Complete bearing failure due to heat or eccentricity; (c) Loss of oil pressure; (d) Rubbing of rotor and turbine blade tips; and, (e) Physical deformations along the rotor resulting in high forces, which in turn cause sudden high vibration levels.

In the testing of certain rotary machine components, such as the rotor systems used in turbojet engines, it is desirable to conduct tests in a heated environment at speeds and temperatures encountered in actual operational use. Accordingly, the apparatus utilized with the present invention in a specified application is adapted to heat the test specimen to normal operating temperatures and above while the specimen is being driven at any desired velocity including normal operating speeds and overspeeds. While in the driven condition the rotor is graphically observed, at various points along a datum line, on an electronic display and any anomalies in the rotor are determined. Specifically, the invention is capable of detecting minute physical changes in the rotor when operated in its natural environment. These changes can be pinpointed, or the entire physical deformation occurring along the length of the rotor are displayed on an oscilloscope screen. These physical changes are measured separately by meter readout for increased accuracy. After these changes are accurately measured, interpreted and corrected, at normal operating speeds, the rotor is then subjected to overspeeds. This overspeed condition will normalize all internal stresses and at the same time check for any possible overspeed failures. This will include defining the true conditions of the bearings and their behavior.

The overspeed thermal dynamic testing machine of the present invention can be used to analyze and correct high speed steam turbine rotors and other equivalent type rotors in their environmental conditions and the invention is not to be limited to any specific application.

The testing machine of the present invention also comprises a rigid base equipped with a cover which when closed forms an air-tight test cell above the base. By evacuating this cell during tests, and by heating the rotating test specimen by induction, the high temperatures are confined to the test specimen. In other instances where advanced temperatures are not required to simulate the environmental condition of the test specimen, the enclosed cell is not utilized.

The base of the machine is further provided with spaced bearing supports for mounting the bearings on which the test specimen is rotated in such a manner that any one or all of a plurality of bearings can be either selectively held completely rigid, partially rigid, or completely released as desired.

The machine of the present invention further includes a plurality of proximity type sensing means for determining the magnitude and phase of any radial runout that may be present at each of a plurality of stations located along the axial length of the test specimen. The machine further includes additional sensing means for determining any axial deformation including the magnitude and angle of any axial deformation which may occur at the various components of the bearings that support the test specimen. The sensing means are used to record data in specific organized sequences in accordance with methods of the present invention and the recorded data is used to systematically determine and isolate discrepancies present in the test specimen and supporting bearings.

As the most important feature of the present invention, the above described discrepancies are automatically sequentially determined both as to magnitude and precise location along the test specimen and the over-all picture of these discrepancies is delivered to a cathode ray oscilloscope. In this way it is possible to visually observe the total picture of the discrepancies throughout the longitudinal extent of the test specimen in a thermo-dynamic state or in its natural environment.

It is therefore an object of the present invention to provide a machine for the dynamic testing of rotary specimens, such as turbine rotors, which automatically provides an actual visual picture of the magnitude and location of discrepancies along the entire longitudinal extent of the specimen.

It is another object of the present invention to provide a machine for testing rotary specimens which is adapted to support the specimen, during rotation, at a plurality of bearing locations such that the specimen can selectively be either rigidly restrained at the bearing locations to a datum line axis of rotation or selectively released, at said bearing location, for various degrees of freedom of movement.

It is another object of the present invention to provide novel methods for systematically testing a rotor test specimen in a dynamic state such that the magnitude and location of discrepancies in the test specimen can be determined, isolated, and corrected.

It is another object of the present invention to provide novel methods for determining, isolating and correcting discrepancies in bearings of the type that include inner and outer raceways.

Further objects and advantages of the present invention will be apparent from the following description, reference being had to the accompanying drawings wherein preferred forms of embodiments of the invention are clearly shown, in which:

FIGURE 7 is a diagrammatic view illustrating a typical test specimen and the location of sensing means stations along the axial length thereof;

Figure 9:
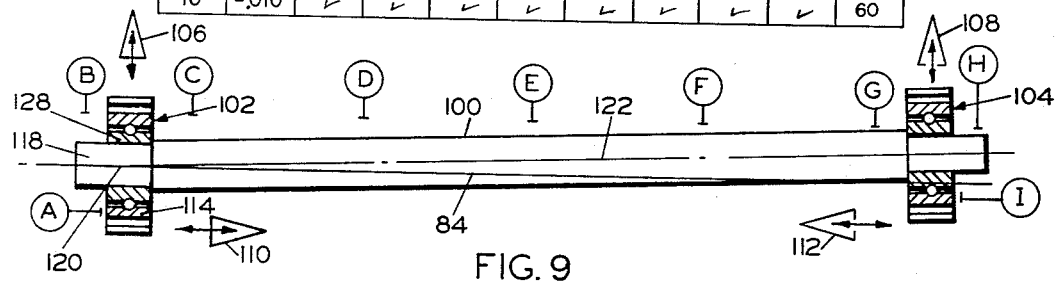
Figure 15:
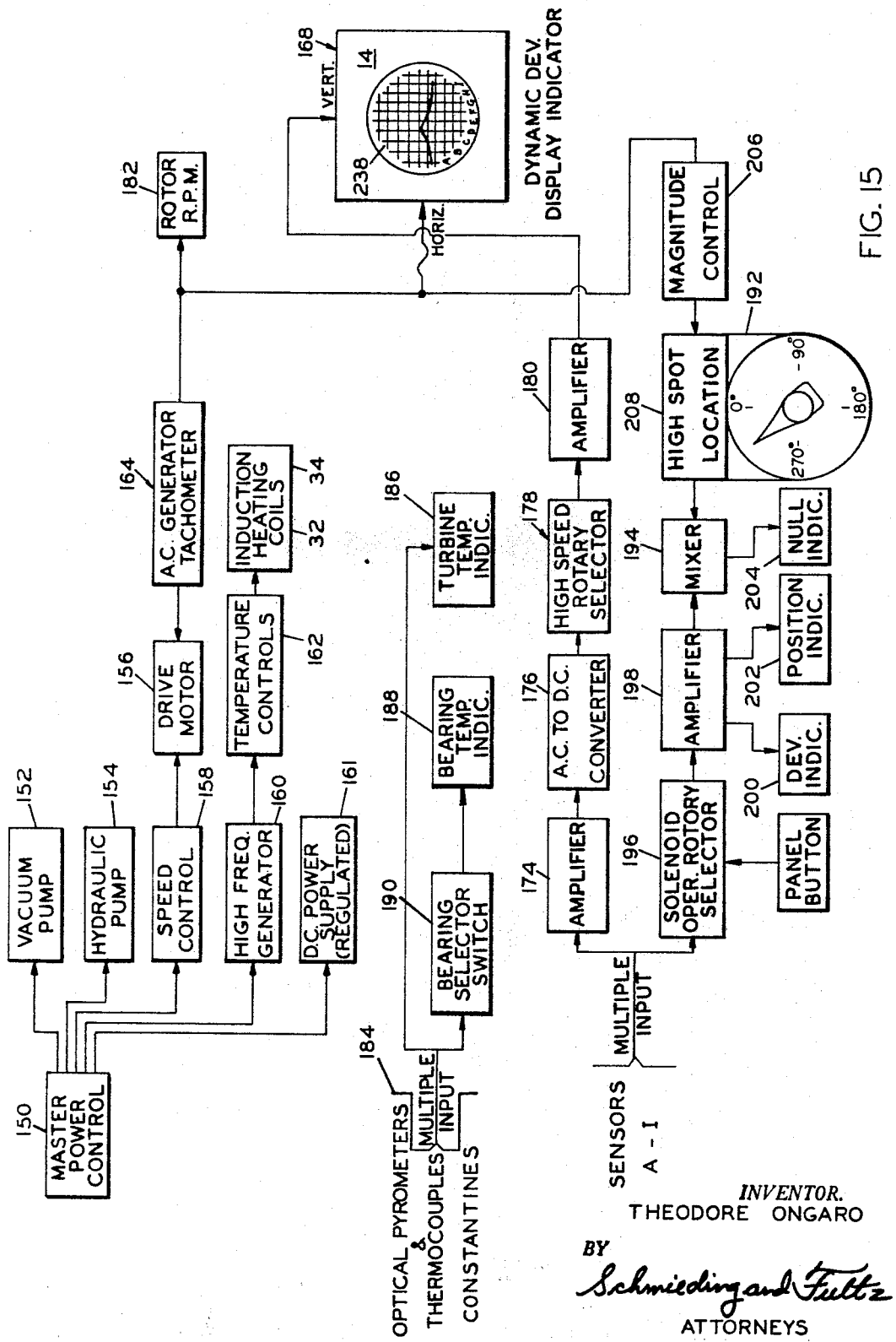
Figure 16:
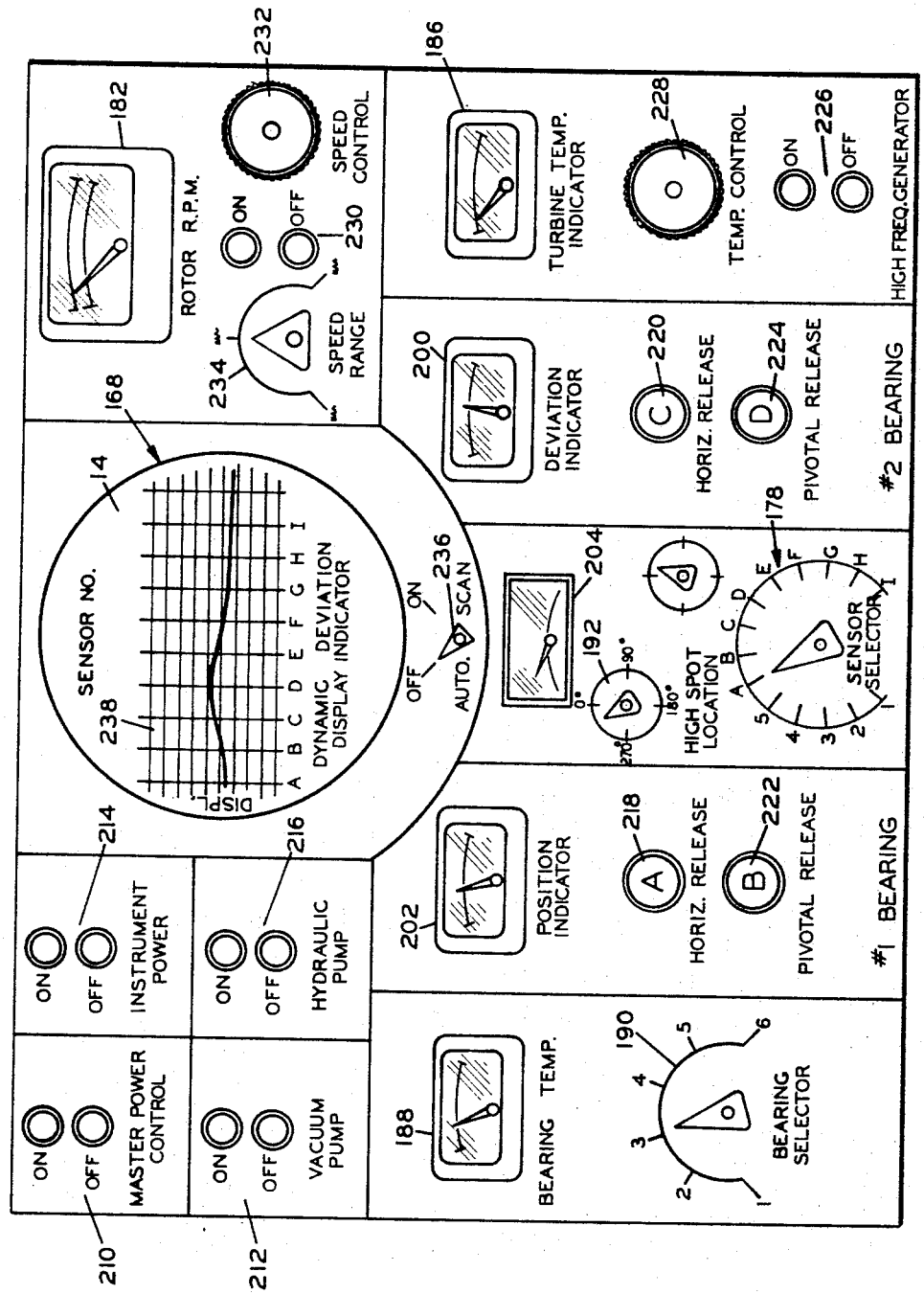

FIGURES 8 through 11 diagrammatically illustrate the steps in the method for checking the bearings of a typical rotary test specimen;

FIGURES 9–A, 10–A, and 10–B are enlarged views showing various discrepancies that can occur at the shaft shoulders and bearing raceways of a typical rotary test specimen;

FIGURES 12, 13, and 14 illustrate the steps in the method of testing a typical test specimen in the form of a shaft for the purpose of determining the magnitude and location of any bend that may be present in the shaft;

FIGURE 15 is a block diagram of a control system for the testing machine of the present invention; and, FIGURE 16 is a diagrammatic view of an instrument panel for the control system of FIGURE 15.

Figure 1:
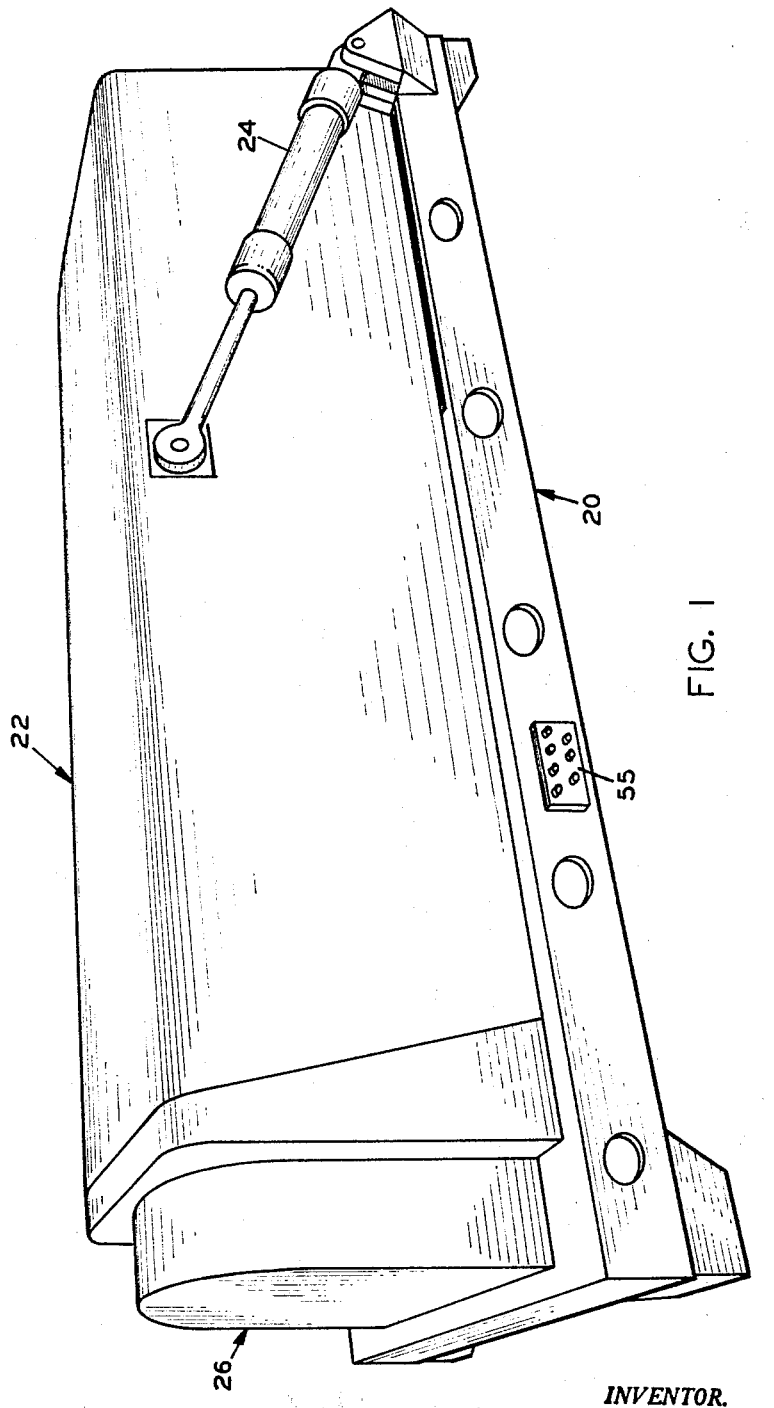
FIGURE 1 is a perspective view of a testing machine constructed in accordance with the present invention.
Figure 2:
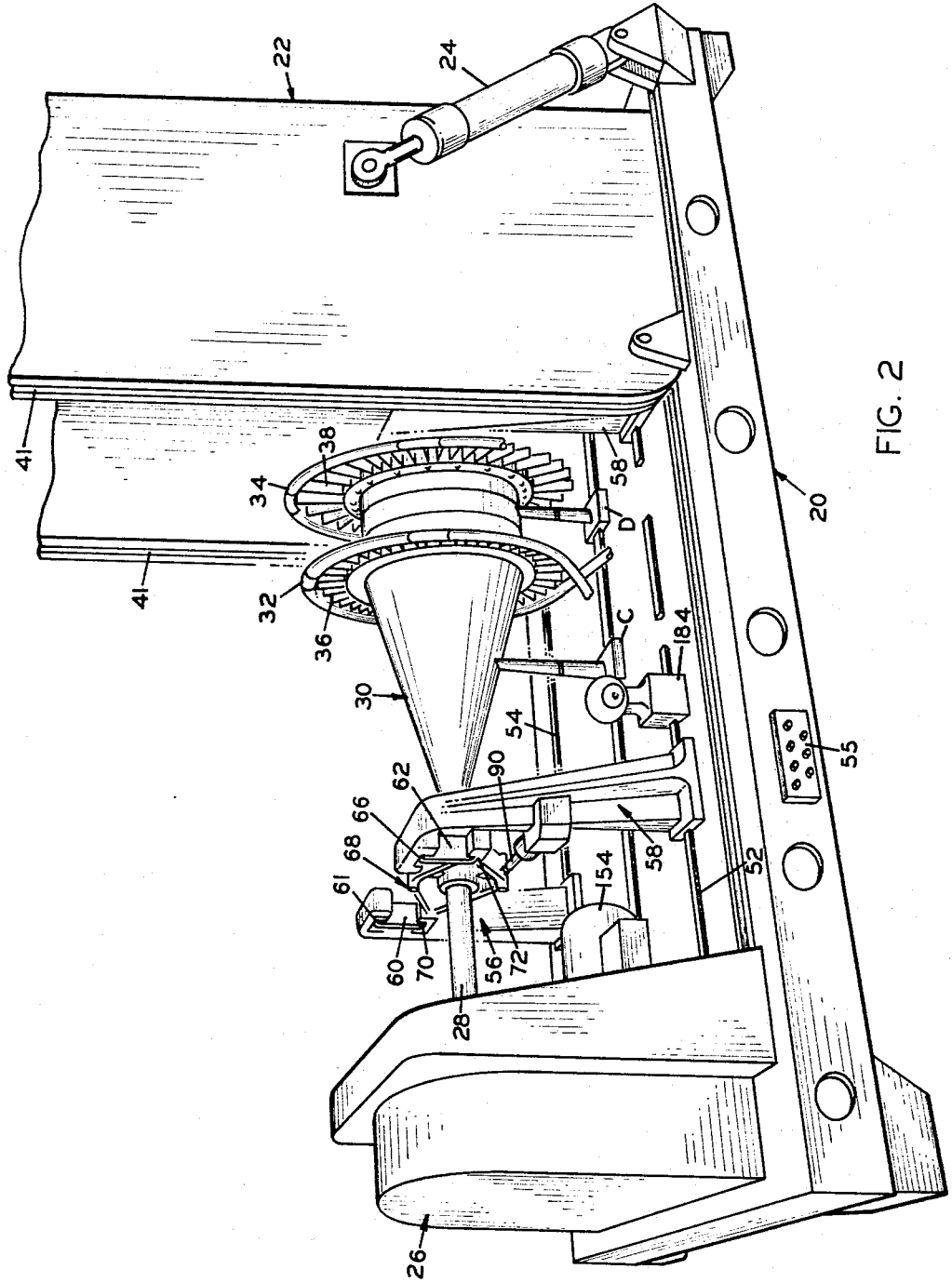
FIGURE 2 is a partial perspective view of the testing machine of FIGURE 1 with the cover of the machine being raised to expose the interior thereof.
Figure 3:
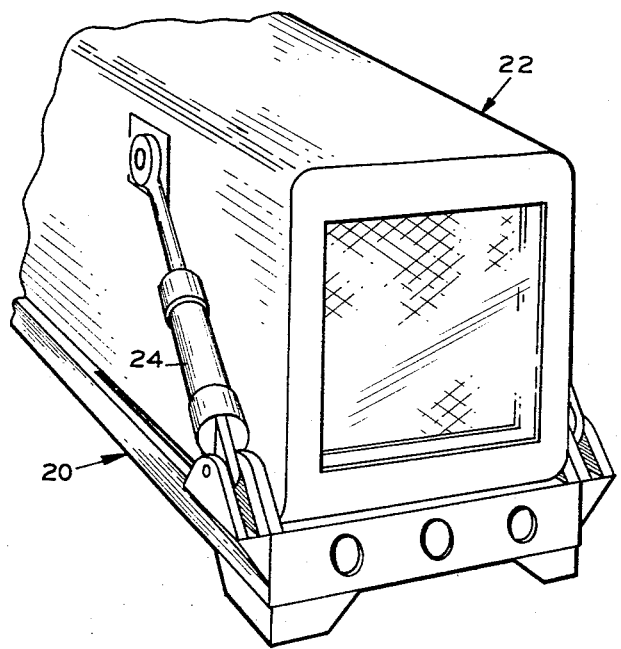
FIGURE 3 is a partial perspective view showing the end of the machine of the preceding figures.

Referring in detail to the drawings, FIGURES 1 and 2 illustrate a testing machine constructed in accordance with the present invention which includes a base indicated generally at 20, a cover indicated generally at 22, and power cylinders 24, the latter serving to lift cover 22 from the closed position of FIGURE 1 to the open position of FIGURE 2. A prime mover indicated generally at 26 is connectable with a shaft 28 of a test specimen—in this instance a turbojet rotor—indicated generally at 30. Machine 20 further includes high frequency induction coils 32 and 34 which surround the two sets of turbine blades 36 and 38. Induction coils 32 and 34 serve to heat the turbine blades 36 and 38, during rotation, in order to simulate actual operating conditions.

The chamber formed by the machine when cover 22 is closed is connected to a vacuum pump so that the chamber can be evacuated to permit the use of a low power capacity prime mover 26 for driving a test specimen, such as a turbojet rotor, where air resistance is a factor. Moreover, evacuation of the test chamber permits the localization of the heating effect of induction coils 32 and 34.

Figure 4:
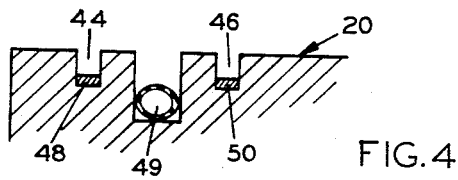
FIGURE 4 is a partial sectional view showing the lower portion of a cover seal for the machine of the preceding figures, the section being taken along the line 4—4 of FIGURE 3.
Figure 5:
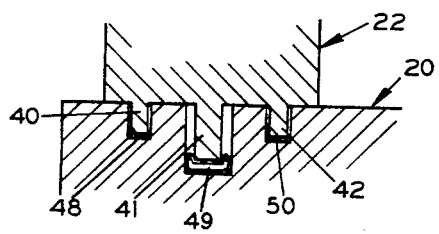
FIGURE 5 is a sectional view of the upper and lower portions of a cover seal for the machine of the preceding figures, the section being taken along the line 5—5 of FIGURE 1.

With reference to FIGURES 4 and 5, a plurality of tongues 40–42 and grooves 44–46 are provided with resilient seals 48–50. This construction forms an air-tight seal at the junction of cover 22 and base 20.

Figure 6:
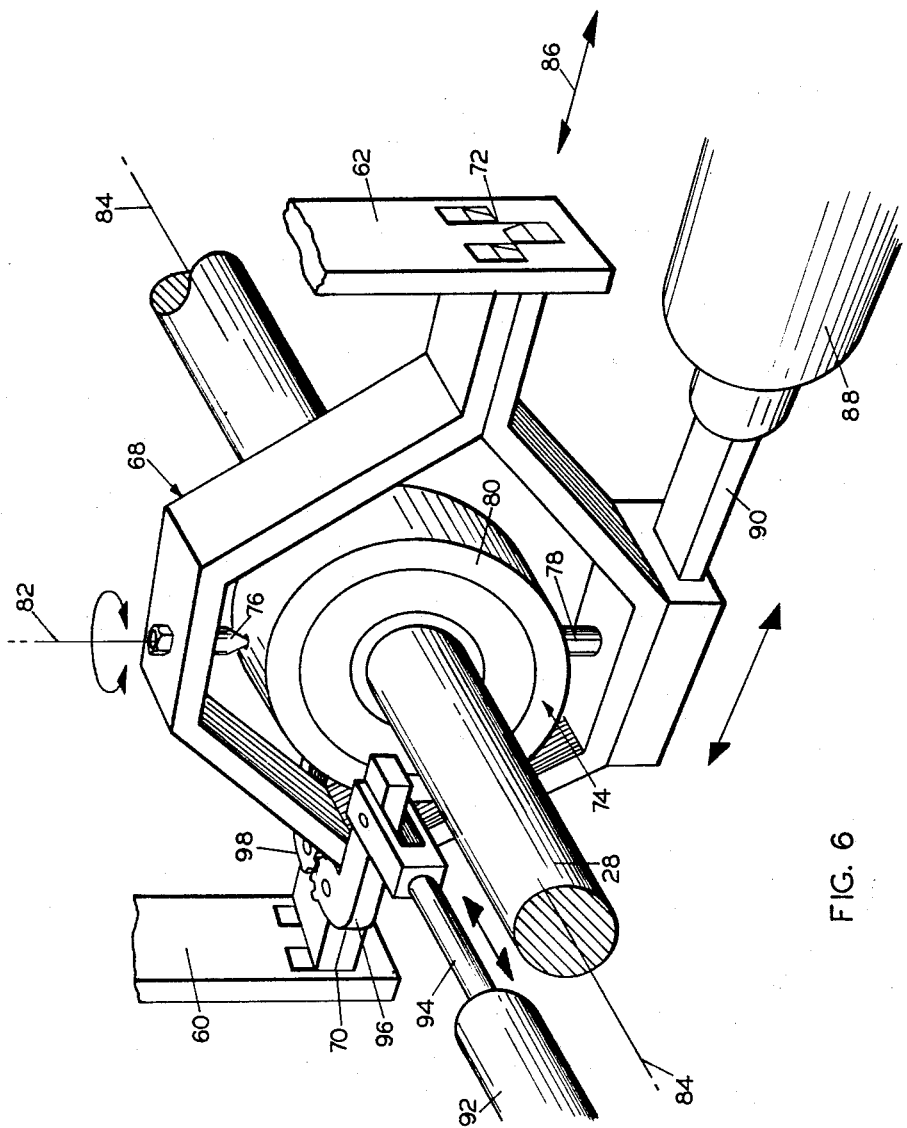
FIGURE 6 is a perspective view showing a bearing mount and associated locking mechanism comprising a portion of the machine of the preceding figures.

Referring next to FIGURES 2 and 6, base 20 includes ways 52 and 54 which serve to mount a plurality of upright bearing supports. The particular test specimen illustrated requires two bearings and four supports. Three of the supports are seen at 56, 58, and 59 in FIGURE 2, the fourth support at the far end of shaft 28 being hidden by the test specimen. The two suspension members 60 and 62 are connected to supports 56 and 58 at upper knife edge pivots 61 and 66 and the lower ends of these suspension members are connected to a bearing mount indicated generally at 68 at lower knife edge pivots 70 and 72. The construction of knife edge pivots 61, 66, 70, and 72 is described in detail in my co-pending application, Ser. No. 46,731, filed Aug. 1, 1960, now abandoned.

With reference to FIGURE 6, a bearing indicated generally at 74 is pivotally supported in bearing mount 68 by an upper pivot pin 76 and a lower pivot pin 78 that engage the top and bottom of the outer raceway 80 of the bearing. With this arrangement bearing 80 can be freed to pivot, relative to bearing mount 68, about a vertical axis 82. Since bearing mount 68 is suspended on knife edge pivots 61, 66, 70, and 72, it is normally free to swing laterally of rotary datum line axis 84 as is indicated by the double-headed arrow 86 in FIGURE 6. The bearing mount 68, however, can be locked against lateral movement by energizing an electro-magnet 88 which, when energized, rigidly grips base block 90 and bearing mount 68. When it is desired to unlock bearing 80 for pivotal movement about vertical axis 82, a solenoid 92 is energized whereby a core 94 of the solenoid opens a pair of pivot latch elements 96 and 98 and thereby moves the latching elements away from engagement with the opposite faces of bearing 74. Bearing 80 is locked against pivotal movement about vertical axis 82 by de-energizing the core 94 of solenoid 92 whereby the solenoid returns latch members 96 and 98 to their latched positions illustrated in FIGURE 2.

Reference is next made to FIGURE 7 which diagrammatically illustrates the location of a plurality of proximity type sensing means stations B through H relative to the base 20 of the testing machine.

It will be understood that the sensing means at each station can be selectively positioned at any phase angle relative to rotary datum line 84 simulating the axis of rotor rotation relative to the housing. The zero phase angle is arbitrarily selected as coincident with the vertical line zero in FIGURE 7. Proceeding in a clockwise direction, as viewed from the left end of the diagrammatic view of FIGURE 7, the 90 degree phase angle is coincident with the horizontal line 90, the 180 degree phase angle is coincident with the vertical line 270. It will now be understood that a frame of references for determining abnormalities of a rotary test specimen is provided by rotary datum line 84, sensing means stations B through H, and the phase angle reference lines zero, 80, 180, and 270.

It should be pointed out that before the shaft assemblies are tested with the machine of the present invention, it has been determined that they are in perfect dynamic balance, this condition having been established in a balancing machine prior to installation in the testing machine of the present invention.

Figure 8:
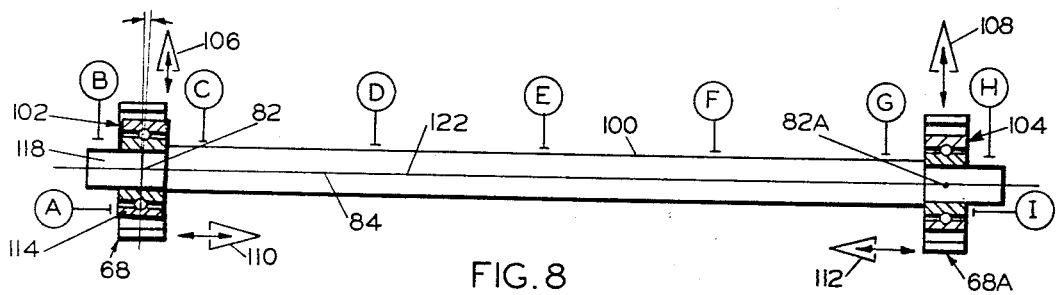

FIGURES 8 through 11, 9–A, 10–A, and 10–B illustrate typical test sequences for checking the bearings and shaft shoulders of rotary test specimens. Specifically, FIGURE 8 represents rotary testing of specimen 100 with both of the bearings 102 and 104 free to rotate relative to their respective bearing mounts 68 and 68–A about vertical axes 82 and 82–A. This freedom is achieved by opening the previously described locks 96 and 98 of FIGURE 6. The bearings 102 and 104 are also free to shift laterally relative to rotary datum line 84, as is indicated by arrow 86 in FIGURE 6, since the previously described lateral locking solenoid 88 is de-energized. The directions of freedom of movement of bearings 102 and 104 are diagrammatically represented in FIGURE 8 by the open bases of lateral lock symbols 108 and 106 and pivotal lock symbols 110 and 112.

With continued reference to FIGURE 8, when shaft 100 is rotated in the testing machine, a sensor A, that reads on the face of outer raceway 114 of bearing 102, detects the motion of the outer raceway in the magnitude of —.010 at a phase angle of 60 degrees. This is recorded at A in the table of FIGURE 8. It will further be seen that all of the radially directed sensors B through H are well within tolerance. Also, longitudinal sensor I that reads on the face of outer raceway of bearing 104 is well within tolerance. The discrepancy of —.010 as sensor A indicates may be caused by an inclination in the longitudinal axis 120 of shaft shoulder 118 relative to the longitudinal axis 122 of the main portion of shaft 100. This condition is illustrated in FIGURE 9–A.

Figure 10:
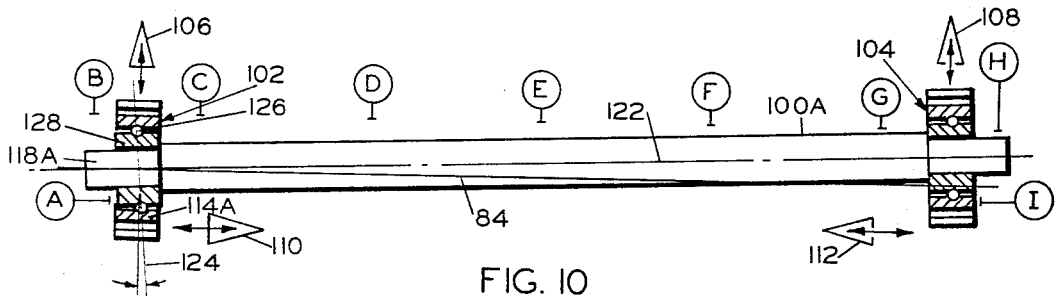

As another possibility, the discrepancy of —.010 at sensor A may be due to the condition illustrated in FIGURE 10–A and substantiated by the table of FIGURE 10. It is seen that the plane 124 that defines the path of ball bearings 126 is not normal to rotary datum line 84. This is due to the offcenter location of the arcuate groove 127 which forms the ball track in outer raceway 114–A, FIGURE 10. The shaft being tested in FIGURE 10–A is designated 100–A to differentiate it from shaft 100 of FIGURE 9–A. In FIGURE 10–A, the longitudinal axis 120 of shaft shoulder 118–A is coincident with the longitudinal axis 122 of the main shaft portion of shaft 100–A.

As still another possibility, the discrepancy of —.010 at sensor A in FIGURE 8 may be due to still another condition illustrated in FIGURE 10–B, wherein the longitudinal axis 120 of the hole 131 through inner raceway 128 is inclined relative to rotary datum line 84.

Any one of the above mentioned causes for the discrepancy of —.010 at sensor A, FIGURE 8, may be present separately or concurrently. The particular technics for isolating these discrepancies will vary depending on what is observed at various sensors with various testing sequences, since there are numerous possible combinations of discrepancies.

The typical test for determining the discrepancy of FIGURE 9–A is illustrated in FIGURE 9. Here, left bearing 102 is completely locked, as is indicated by the closed bases of lock symbols 106 and 110, and right bearing 104 is completely free, as is indicated by the open bases of lock symbols 108 and 112. When the shaft is rotated, with sensor A reading the face of outer raceway 114, it is noted at sensors B through H that the shaft is out of tolerance. The discrepancy is by progressively increasing amounts proceeding along the length of shaft 100 from sensor B through sensor H. Moreover, the discrepancies are at a phase angle of 150 degrees. Sensor A is next moved inwardly (with left bearing 102 still locked) so as to read the face of inner raceway 128. Here it is determined that no discrepancy is present at sensor A on the inner raceway, and, therefore, the discrepancy first noted in the test of FIGURE 8 is caused by an inclination of the longitudinal axis 120 of shaft shoulder 118 relative to the longitudinal axis 122 of shaft 100. The condition is best seen in FIGURE 9–A.

Another typical test for determining the nature of the discrepancy of —.010 noted at sensor A in FIGURE 8 is illustrated in FIGURE 10. Here again, left bearing 102 is totally locked as is indicated by the closed bases of lock symbols 102 and 110 and right bearing 104 is completely free as is indicated by the open bases of lock symbols 108 and 112. In test of FIGURE 10, it will be noted from the table that a discrepancy of +.005 is read at sensor A when sensor A reads the face of inner raceway 128. Also, sensors B through H show progressively increasing discrepancies, first positive at B and then negative from C through H. This indicates that the plane 124 in which ball bearings 126 travel is not normal to rotary datum line 84, as is ilustrated in FIGURE 10–A.

A similar test can be made to determine the discrepancy of FIGURE 10–B. This can be differentiated from the discrepancy of FIGURE 9–A in that an out of tolerance condition will be read at sensor B and the face of inner raceway 128–A will be in tolerance as determined by sensor A.

Figure 11:
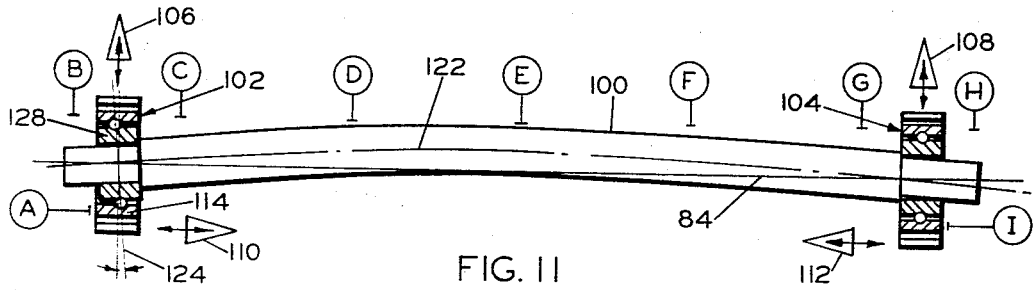
Figure 10B:
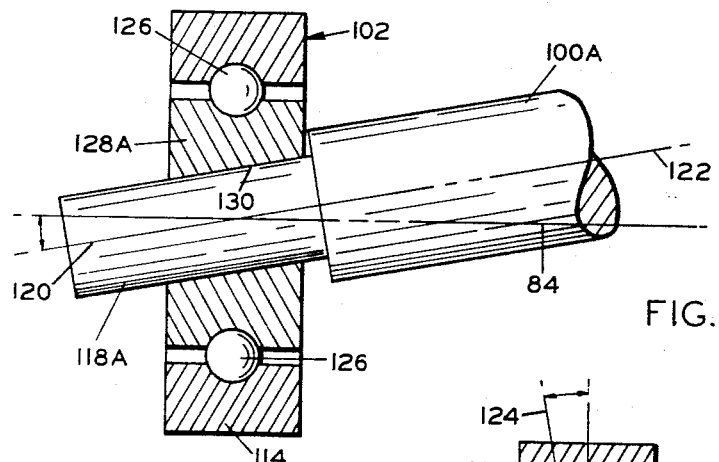
Figure 10A:
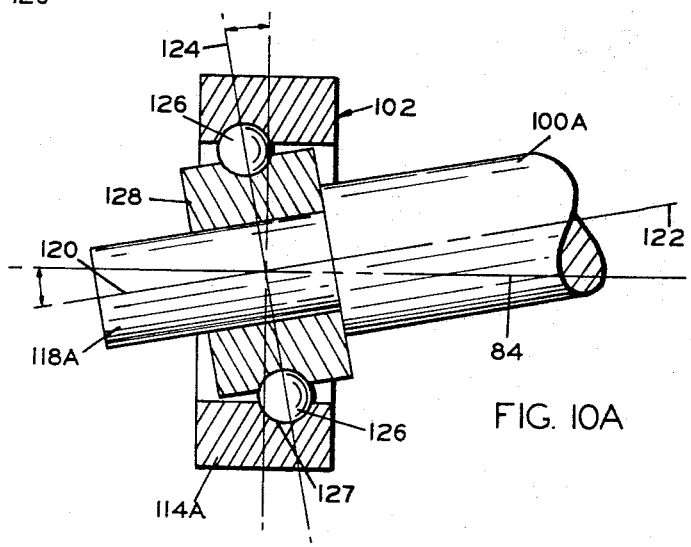
Figure 9A:
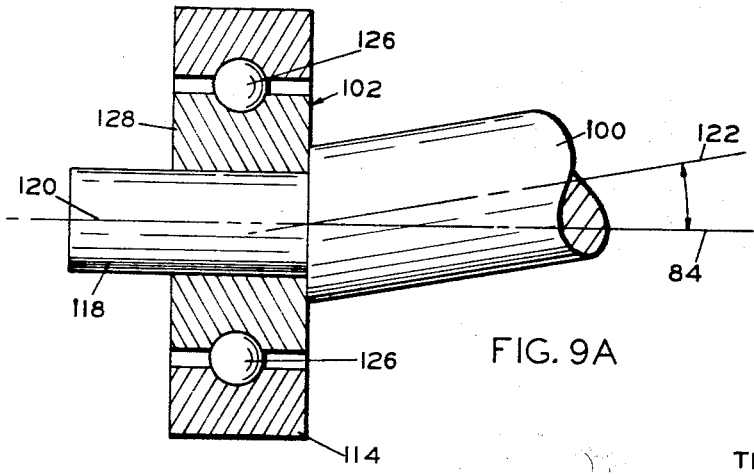

FIGURE 11 is a typical diagrammatic showing of what the testing machine actually indicates when it exactly simulates the rigid bearing housings that support the actual specimen such as a turbojet engine. The rotary datum line 84 of the testing machine is now the equivalent of the actual rotary datum line of the housing of the turbojet engine. Both left bearing 102 and right bearings 104 are completely locked against lateral and pivotal freedom as is indicated by the closed bases of lock symbols 106, 108, 110, and 112. It will be noted from FIGURE 11 that shaft 100 assumes a bowed configuration when both bearings are locked.

Reference is next made to FIGURES 12 through 14 which illustrate another test which determines that a rotary test specimen in the form of a simple shaft 130 is bent along its principal shaft axis 132. In conducting this test, the bearings and shaft shoulders are determined to be in tolerance. The test specimen shaft 130 is first mounted in the machine as previously described. All sensors are next radially and axially moved and positioned relative to rotary datum line 84. This can be accurately done by use of a position indicator 202, FIGURES 15 and 16, later to be described herein. The specimen is next rotated at 5–10 r.p.m. and any devitations are recorded in the table of FIGURE 12. The phase angles are also noted at each sensor A through I by using a high spot location device 192 and a null indicator 204, FIGURES 15 and 16, as later described herein. These deviations and phase angles must not be departed from during all subsequent test procedures if the rotor is to perform with maximum thermal dynamic stability. The test sequence of FIGURES 12 through 14 is started with all of the lock symbols 106, 108, 110, 112 in an unlocked configuration as is indicated by the open bases of the lock symbols. As is indicated in the table of FIGURE 12, sensors A, B, and C are within tolerance, whereas sensors D through I show a definite out of tolerance condition. It will be assumed that the shaft is in dynamic balance as would be determined in a balancing machine prior to conducting the present test. This is substantiated since the axis of rotation of bearings 134 and 136 are coincident with the rotary datum line 84 of the machine.

Referring to FIGURE 13, left bearing 134 is completely freed as is indicated by the open bases of lock symbols 106 and 110, whereas right bearing 136 is completely locked as in indicated by the closed bases of lock symbols 108 and 112. With the left bearing 134 free, as seen in FIGURE 13, sensors A, B, C, and D show definite out of tolerance conditions resulting from a loss of symmetry of the left end of shaft 130 about rotary datum line 84.

The next step in the test is illustrated in FIGURE 14, where left bearing 134 is totally locked as is indicated by the closed bases of lock symbols 106 and 110, and right bearing 136 is totally free as is indicated by the open bases of lock symbols 108 and 112. Here sensors A, B, and C indicate that the left end of shaft 130 conforms with rotary datum line 84, but sensors D through I indicate an out of tolerance condition along the right portion of shaft 130. This clearly shows that the test specimen 130 is not symmetrical along its principal shaft axis 132.

Reference is next made to FIGURE 15 which diagrammatically illustrates the measuring and control circuit in block schematic used with the testing machine of the present invention, and FIGURE 16 showing the primary control panel.

With reference to FIGURE 15, a master power control 150 supplies power to a vacuum pump 152 for evacuating the previously described test cell in which the specimen is heated and rotated. The main drive motor for rotating the test specimen is indicated generally at 156 and is provided with a speed control 158 connected to master power control 150. The previously described induction heating coils 32 and 34 are energized through a high frequency generator 160 and temperature control 162. A hydraulic pump 154 is connected to master power control 150 and serves to supply oil to the bearings of the test specimen. This hydraulic pump is seen at 154 in FIGURE 2. Pump 154 also provides pressurized fluid for actuating power cylinders 24 which open and close test cell cover 22.

A tachometer that indicates r.p.m. of the test specimen is driven by the drive motor and indicated at 182 in FIGURES 15 and 16. Temperature sensing means 184 which may be in the form of optical pyrometers, one of which is seen in FIGURE 2, feed a turbine temperature indicator 186. A bearing temperature indicator seen at 186 in FIGURE 15 is connected with a suitable bearing temperature indicator such as a thermo-couple or thermistor, not illustrated.

An AC generator is diagrammatically indicated at 164 in FIGURE 15. This generator has as its rotor, the rotor of the specimen under test or a rotor driven in exact synchronism with the rotor under test. An alternating current signal or voltage is generated thereby that has a frequency directly and accurately controlled by the speed of rotation of the specimen. The alternating current signal from the generator 164 is applied to the horizontal sweep elements of the cathode ray oscilloscope. The alternating current signal is, of course, first converted to a saw tooth wave signal to provide the linear sweep. By deriving the sweep signal directly from the rotation of the specimen, the duration of a single sweep is exactly of the time period of a single revolution of the specimen. This permits the trace across the cathode ray tube face 238 to be calibrated from 0° to 360°. AC generator 164 is also diagrammatically represented in FIGURE 7 to show a rotor 170 for the generator affixed to the shaft of the test specimen 100. In the actual machine, rotor 170 of generator 164 is mounted on the drive shaft of prime mover 26, FIGURE 2.

With continued reference to FIGURE 7, a specimen reference disk diagrammatically illustrated at 172 is also mounted on the drive shaft of prime mover 26, FIGURE 2. This reference disk provides indica at the test specimen 100 for determining the actual physical location on the test specimen at which an out of tolerance discrepancy is located. Reference disk 172 is mounted on test specimen 100 such that the stationary indicator diagrammatically illustrated at 173 points to zero on disk 172 when the sweep of the oscilloscope of deviation indicator 178 is at the zero location. In addition, the rotor of generator 164 must be properly located relative to the field of the generator so that the trace 166, FIGURE 7, on the oscilloscope will be at zero when indicator 173 points to zero on specimen reference disk 172.

If the rotor of the specimen under test is in perfect rotation, the trace on the face 238 of the graphic indicator 168 will be a perfectly straight line. The primary purpose of the system, however, is to determine when the rotor is out of perfect rotation and also to determine where the discrepancy occurs. As indicated above, a plurality of proximity sensors A through H are positioned adjacent the rotor. Each of these sensors will give a voltage signal related to its distance from the rotating rotary datum line. If the distance remains the same throughout the rotation, this signal will be uniform. If, however, a discrepancy should occur at any position along the rotor specimen, that is, either a high spot or out or round, the distance from the rotary datum line to the sensor will also vary accordingly. There will result then, from the output of that particular sensor, a voltage signal varying with the variation of the discrepancy.

Each of the voltage signal outputs is applied to the vertical deflection elements of the cathode ray tube 168 to vary the horizontal trace in accordance with any discrepancy that may occur.

As seen in FIGURE 15, the signals from sensors A through H are amplified at an amplifier 174 from which they pass to an AC to DC converter 176. The DC signals leaving converter 176 pass through a rotary sensor selector 178, amplifier 180, and thence to the vertical plates of oscilloscope 15 of dynamic deviation indicator 168. The rotary selector is operative to sequentially apply the outputs of the sensors to the graphic display. In this way, each sensor position is looked at.

When a discrepancy does occur, the trace on the face 238 of the cathode ray oscilloscope is deflected vertically. The degree or amplitude of displacement is dependent upon the magnitude of the DC voltage applied there. The DC voltage being dependent, in turn, on the amount or magnitude of error in the rotation of the specimen. The position of the discrepancy, for instance, if it is a high spot, will also be apparent on the face or screen 238. It was indicated above that the sweep on the horizontal elements is synchronized with the rotation, that the sensors are deriving signals from the same rotation, and that the reference disk establishes the zero point. The vertical deflection will, therefore, occur at the exact degree of the high spot.

The graphic dynamic deviation display indicator 168 is intended to give a quick look at one and all of the positions represented by the sensors A to H. If a discrepancy does occur, a more accurate analysis would be required than that provided by the visual indicator. A high spot location indicator system is also shown in FIGURE 15 and forms an important segment of the preferred embodiment of the invention. In operation of this indicator, each of the voltage signals derived from the sensors are selected by the selector switch 196 to be amplified by amplifier 198 and then fed to the mixer 194. Similarly to the visual indicator, a reference signal must be utilized for comparison with the sensed signal. Here also the signal from the AC generator 164 is utilized again for comparison with the sensed voltages in the mixer 194. The alternating signal from the generator 164 is applied to the mixer 194 through the magnitude control 206 and the high spot locator 208.

The magnitude control 206 is a potentiometer adjustable to a voltage that is equal in magnitude to the selected sensor voltage applied to the mixer 194 through amplifier 198. The phase of the voltage from magnitude control 206 is, however, adjusted by high spot location indicator 192 to be 180° out of phase with the voltage from amplifier 198. The combined effect of equal amplitude and opposite phase relationship between the high spot location indicator voltage and the voltage from amplifier 198 in the mixer 194 will give a null indication on meter 204. When the voltage signals from each of the sensors is uniform—indicating uniform spacing from the rotary datum line to the sensor in any part of the rotation, the helical potentiometer of the high spot location will give a null balance at a different degree than 0°. The null balance will appear at that point of the rotation at which the discrepancy occurs. The helical potentiometer being calibrated will read off directly the position of the discrepancy. For example, if the recording apparatus and control panel of FIGURES 15 and 16 indicate a high spot location of a discrepancy as being present at a phase angle of 90 degrees, then the discrepancy can be physically located and marked on shaft 100, FIGURE 7, by referring to specimen reference disc 172. The signals from sensors A through I are also fed from amplifier 198 to a deviation indicator 100 and a position indicator 202. The position indicator 202 shows the distances of sensors A through I from rotary datum line 84. The deviation indicator 200 reads the deviations of the rotor from datum line 84 which deviations appear on the tables of FIGURES 8 through 14.

Although the sensors A through I are all shown at the same distance from rotary datum line 84 in FIGURES 8 through 14, the sensors will actually be located at progressively increasing or decreasing distances from rotary datum line 84 to accommodate the configuration of the turbine rotor.

With reference to FIGURE 16, on-off switches 210–216 are provided for master power control 150, vacuum pump 152, hydraulic pump 216 and instrument power 214. The previously described horizontal locks 88–90 for bearing mounts 68, FIGURE 6, are controlled at push buttons 218 and 220 and the pivotal locks 92–96 for bearing mounts 68 are controlled at push buttons 222 and 224. The high frequency generator is turned on and off at push buttons 226 and the temperature of the test cell is controlled at a knob 228.

Control of prime mover 26, FIGURE 2, is accomplished by push buttons 230, speed control knob 232, and speed range selector 234. In operation, when it is desired to read bearing displacement at any one of a plurality of bearings the horizontal release buttons 218 and 220 and the pivotal release buttons 222 and 224 are utilized to selectively lock and release any selected bearing. With reference to FIGURE 16, the selector switch of sensor selector 178 is positioned at one of the two bearing sensors A or I. The specimen 30 of FIGURE 2 is a two-bearing system and therefore only two of the bearing sensors A and I are required. In connection with other more complex rotary specimens additional coaxial bearings must be analyzed. The particular specimen of FIGURE 2 is one-half of the turbine rotor.

The test for bearing displacement is conducted by first setting the selector switch of sensor selector 178 at A with switch 236 of the deviation display indicator 168 on the "off" position. The release buttons 218–224 are next selectively utilized to conduct the sequence of testing steps previously set forth in connection with the sequence of FIGURES 7–11. In doing this, the release buttons are used to selectively lock and release the locks diagrammatically illustrated at 106, 108, 110, and 112. The results of the above-mentioned bearing displacement tests are illustrated and described above in connection with FIGURES 9–A, 10–A, and 10–B. The quantitative bearing behavior obtained from the tests is precisely displayed at dial 204, FIGURE 16. The location of the maximum reading is shown by a phase angle indication on high spot location indicator 192 and the magnitude of displacement by setting of the control 206. Moreover, these quantitative values and phase angles are logged in the tables of each of the FIGURES 8–11. The physical discrepancy is shown, in exaggerated configuration, in the FIGURES 9–A, 10–A, and 10–B. Any of the conditions illustrated could be present in the specimen and the value of the present machine is to selectively isolate and determine the exact location and magnitude of the various possible discrepancies.

In operation, when it is desired to read a discrepancy at any one of the sensor stations A through I, an auto-scan switch 236, FIGURE 16, is turned to the "off" position and rotary sensor selector 17B is manually moved to the particular sensor station A through I. This feeds the appropriate voltage signal to oscilloscope 114 of dynamic differential indicator 168 and if a discrepancy is present in the specimen, at the particular sensor station being studied, then a vertical deviation will occur on a screen 238 of oscilloscope 14 of dynamic deviation indicator 168.

When it is desired to observe an over-all picture of radial deviations occurring longitudinally along the test specimen, from stations B through H, auto-scan switch 236 is turned to the "on" position. This causes rotary sensor selector 178 to automatically rotate and sequentially feed voltage signals through sensors B through H to the vertical plates of oscilloscope 14 which displays a visual picture of the location and magnitude of deviations at all of the sensor stations B through H.

When it is desired to find the phase angle of the high spot of a deviation at any radial sensor station B through H, or at any axial station A or I, the auto-scan switch 236 is turned to the "off" position and rotary sensor selector 178 is turned to the particular station to be studied. Rotary selector 192 is next rotated until null indicator 204 indicates a null and the phase angle of the high spot can then be physically located by making reference to high spot location indicator 172, FIGURE 7, mounted on the prime mover shaft as previously described. The phase angle is also indicated on high spot location indicator 192 on the control panel of FIGURE 16.

The above-described operation and testing sequence applies to low rotary speeds, normal operating rotary speeds, as would be encountered under flight conditions, and overspeeds, which would only rarely be encountered under flight conditions.

The various sensors B through H, as previously stated, are adjustable to various longitudinal and radial locations as may be required. Longitudinal adjustment can be accomplished by positioning and locking the sensors at various locations along a dovetail or groove and the distance of the sensor tip from the test specimen, such as 30 in FIGURE 2, can be precisely moved vertically to vary the spacing between the sensor tip and the specimen.

The indication on position indicator 202 is produced by a voltage change that results from a change in capacitance that occurs when the distance between the sensor and the specimen is varied. Hence, it will be understood that when one of the sensors is moved to any desired position, relative to the specimen, the variation in capacitance causes a corresponding change in the signal which shifts the indicator of position indicator 202.

For the purpose of the present specification and claims the term "overspeeds" means rotary turbine velocities in excess of those normally encountered during flight operations or perhaps rotary turbine speeds that are never encountered during flight operations. Overspeeds should never reach velocities which would cause inertia forces to impart radial deformation exceeding the elastic limit of the materials. Testing the rotors at overspeeds performs the important function of normalizing thermal dynamic stresses.

While the form of embodiment of the present invention as herein disclosed constitutes a preferred form, it is to be understood that other forms might be adopted, all coming within the scope of the claims which follow.

What is claimed is:

1. A testing machine for determining discrepancies in a dynamically balanced rotor component, said machine comprising, in combination, base means; cover means forming an evacuated test cell; first supporting means in said test cell for rotatably mounting said component at one bearing portion; a second supporting means in said test cell for rotatably mounting said component at a second bearing portion; drive means for overspeed rotation of said rotor component; a first locking means at each of said bearing portions for selectively locking or releasing a respective bearing portion for pivotal movement about a vertical axis; a second locking means at each of said bearing portions for selectively locking or releasing a respective bearing portion for lateral displacement in two directions from a rotary datum line, said two locking means being independently lockable and releasable; proximity sensing means mounted in a fixed position relative to said rotary datum line; and heating means for concentrating heating effect on a portion of said rotor component.

2. The testing machine of claim 1 that includes proximity temperature sensing means for reading the temperature of said portion of said rotor component in a rotary state.

3. A testing machine for determining discrepancies in a dynamically balanced rotor component, said machine comprising, in combination, base means; cover means forming an evacuated test cell; first supporting means in said test cell for rotatably mounting said component at one bearing portion; a second supporting means in said test cell for rotatably mounting said component at a second bearing portion; drive means for overspeed rotation of said rotor component; a first locking means at each of said bearing portions for selectively locking or releasing a respective bearing portion for pivotal movement about a vertical axis; a second locking means at each of said bearing portions for selectively locking or releasing a respective bearing portion for lateral displacement in two directions from a rotary datum line, said two locking means being independently lockable and releasable; a plurality of radial deviation proximity sensing means located radially of and spaced longitudinally along said rotary datum; pivotal deviation sensing means at one end of one of said bearing portions; and heating means for concentrating heating effect on a portion of said rotor component.

4. The testing machine of claim 3 that includes proximity temperature sensing means for reading the temperature of said portion of said rotor component in a rotary state.

5. The machine defined in claim 1 that includes a phase angle locator disk keyed for rotation with said rotor component; a sine wave generator including a rotor keyed for rotation with said rotor component; and a cathode ray oscilloscope in circuit with said sine wave generator and said sensing means.

6. The machine defined in claim 3 that includes a phase angle locator disk keyed for rotation with said rotor component; a sine wave generator including a rotor keyed for rotation with said rotor component; and a cathode ray oscilloscope in circuit with said sine wave generator and said sensing means.

7. A testing machine for determining discrepancies in a turbine rotor and bearing assembly at elevated temperatures, said machine comprising, in combination, base means; cover means forming an evacuated test cell; a plurality of bearing mounts in said test cell for rotatably supporting the bearings of said assembly; means for supporting said bearing mounts for lateral movement; locking means for selectively locking and releasing said bearing mounts relative to said supporting means and a rotary datum line; means for pivotally mounting said bearings on said bearing mounts; a second locking means for selectively locking and releasing said bearings relative to said bearing mounts and a rotary datum line, said two locking means being independently lockable and releasable; driving means including a drive shaft for driving said rotor at overspeeds; an alternating current sine wave generator driven by said drive shaft; a cathode ray oscilloscope in circuit with said sine wave generator; proximity sensing means for determining a discrepancy in said specimen relative to said rotary datum line, said sensing means including a variable voltage output delivered to said oscilloscope; and heating means for concentrating heating effect on a portion of said rotor.

8. The machine defined in claim 7 wherein said sensing means is positioned to read on a longitudinally facing side of a raceway of a bearing of said assembly.

9. The machine defined in claim 7 wherein a phase angle location plate is rotated by said driving means.

10. The apparatus defined in claim 7 wherein said sensing means comprises a plurality of proximity sensors at longitudinally spaced locations along said rotor and bearing assembly, each of said sensors including a variable voltage output delivered to said oscilloscope; and a continuously driven rotary sensor selector for sequentially delivering voltage signals from said sensors to said oscilloscope.

11. A testing machine for a dynamically balanced turbine rotor and bearing assembly, said machine comprising, in combination, base means; a first supporting means mounted on said base means; a first bearing mount; means supporting said first bearing mount for lateral movement relative to said first supporting means and a rotary datum line; means for pivotally mounting a first bearing of said assembly in said first bearing mount for pivotal movement about a vertical axis; a first locking means for locking said first bearing mount against lateral movement away from said datum line; a second locking means for locking said first bearing against pivotal movement relative to said first bearing mount; a second supporting means mounted on said base means in spaced relationship with said first supporting means; a second bearing mount, said first and second locking means being independently lockable and releasable; means supporting said second bearing mount for lateral movement relative to said second supporting means and said rotary datum line; means for pivotally mounting a second bearing in said second bearing mount for pivotal movement about a second vertical axis; a third locking means for locking said second bearing mount against lateral movement away from said datum line; a fourth locking means for locking said second bearing against pivotal movement relative to said second bearing mount, said third and fourth locking means being independently lockable and releasable; means for driving said rotor and bearing assembly at overspeeds; means for heating said rotor; a removable cover mounted on said base and forming a sealed chamber; means for evacuating said sealed chamber; and a proximity sensing element adjacently mounted in a fixed location relative to said rotary datum line.

12. The steps in the method of testing a dynamically balanced turbine shaft and bearing assembly of the type wherein two bearings each include inner and outer raceways, said method comprising, supporting said shaft by said two bearings with said two bearings being free to shift laterally and to pivot about a vertical axis and with said shaft free to rotate about a rotary datum line; rotating said shaft and inner raceway relative to said outer raceway; determining any pivotal shifting of said bearing relative to said support; locking one of said bearings against lateral and pivotal movement; rotating said shaft and inner raceways; determining the magnitude and phase angle location of any radial deviation of said shaft relative to said rotary datum line, at spaced stations along the longitudinal length thereof; checking said inner raceway of said one bearing for pivotal deviation relative to said outer raceway with said one bearing locked against lateral and pivotal movement; correlating the magnitude and phase angle location of said radial deviation as indicative of the rotor discrepancy.

13. A testing machine for determining discrepancies in a dynamically balanced rotor component comprising, a supporting means for rotatively mounting said rotor component, drive means for rotation of said rotor component, variable speed means connected to said drive means for varying the speed of said rotation, said rotor component in rotation defining a rotary datum line; a plurality of radial deviation proximity sensing means located radially of and spaced longitudinally along said rotary datum line; a graphic display means having horizontal and vertical deflection components, an alternating current generator operable in synchronism with the rotation of said rotor component for deriving a sine wave signal, means for connecting said sine wave signal to said horizontal deflection elements to provide a linear trace representative of said rotary datum line on said display means once for each revolution of said rotor component, means connecting the output of each one of said proximity sensors to said vertical deflection elements to deflect said linear trace in a magnitude and degree corresponding to a discrepancy in said rotation.

14. A system for determining discrepancies in a dynamically balanced rotor component comprising, means for rotatably mounting said component, drive means for rotating said component, and means for varying the speed of said drive means; a plurality of radial deviation proximity sensing means, spaced longitudinally along said rotor component, means for maintaining a predetermined distance between said sensing means and a rotary datum line of said component, said sensing means developing a signal representative of said spacing from said rotor relative to said datum line; a sine wave generator having a rotor keyed for rotation with said rotor component, a cathode ray oscilloscope having a pair of deflection elements, means for applying the sine wave signal from said sine wave generator to the first of said deflection element to provide a trace on the face thereof in a first direction representative of said rotary datum line, and means connected to each of said plurality of sensors connecting the signals therefrom to the second of said deflection elements to deflect said trace in a second direction upon the occurrence of a discrepancy in the rotation of said rotor component from said datum line.

15. The system as set forth in claim 14 wherein said means connecting said sensors to said oscilloscope includes a step selector switch for sequentially connecting each of said sensors to said oscilloscope.

16. A testing machine as set forth in claim 13 wherein said means for connecting said sine wave signal to said horizontal element comprises, means for connecting said sine wave to a straight line trace; and wherein said means connecting said sensors to said vertical elements comprises, means for converting said output to direct current voltage.

17. A testing system as set forth in claim 13 wherein said rotor component has keyed thereon a locator disk for establishing a relative zero degree.

18. A system for determining discrepancies in a dynamically balanced rotor component comprising, means for rotatably mounting said component, drive means for rotating said component, and means for varying the speed of said drive means; a plurality of radial deviation proximity sensing means spaced longitudinally along said rotor component, means for maintaining a predetermined distance between said sensing means and a rotary datum line of said component; an alternating current generator operable in synchronism with the rotation of said rotor component for deriving a sine wave signal, a comparison circuit, means for feeding each one of said sensor signals to said comparison circuit, means for feeding said sine wave signal to said comparison 180° out of phase with said sensor signals, means for establishing a relative zero degree position, and means for indicating the displacement from zero to 360° of the nulling point of said two signals.

19. A testing system as set forth in claim 18 wherein said means for feeding said sine wave signal to said comparison circuit further includes a magnitude control circuit for comparing the magnitude of said sine wave signal with said sensor signal.

20. A testing system as set forth in claim 18 where said means for feeding said sensor signals to said comparison circuit includes a selector switch and control means for activating said switch.

21. A testing machine for determining discrepancies in a dynamically balanced rotor component, said machine comprising, in combination, base means; first supporting means in said test cell for rotatably mounting said component at one bearing portion; a second supporting means in said test cell for rotatably mounting said component at a second bearing portion; drive means for overspeed rotation of said rotor component; a first locking means at each of said bearing portions for selectively locking or releasing a respective bearing portion for pivotal movement about a vertical axis; a second locking means at each of said bearing portions for selectively locking or releasing a respective bearing portion for lateral displacement in two directions from a rotary datum line, said two locking means being independently lockable and releasable; means for establishing said rotary datum line proximity sensing means mounted in a fixed position relative to said rotary datum line; and means connected to said sensing means for indicating discrepancies in said component along said datum line.

22. The machine defined in claim 21 that includes a phase angle locator disk keyed for rotation with said rotor; a sine wave generator including a rotor keyed for rotation with said rotor component; and a cathode ray oscilloscope in circuit with said sine wave generator and said sensing means.

23. The apparatus defined in claim 21 wherein said sensing means comprises a plurality of proximity sensors at longitudinally spaced locations along said rotor and bearing assembly, each of said sensors including a variable voltage output delivered to said oscilloscope; and a continuously driven rotary sensor selector for sequentially delivering voltage signals from said sensors to said oscilloscope.

References Cited
UNITED STATES PATENTS

| 2,289,200 | 7/1942 | Lundgren | 73—478 XR |
| 2,344,753 | 3/1944 | Van Degrift | 73—465 |
| 2,748,603 | 6/1956 | Wilcox | 73—465 |
| 3,077,781 | 2/1963 | Silver | 73—465 |
| 3,084,445 | 4/1963 | Klimatis | 33—174 |

OTHER REFERENCES

An article entitled "Precision Testing of Gas Turbine Disc" from "Automotive Industries," vol. 2, pages 40 and 41, Jan. 15, 1950.

RICHARD C. QUEISSER, *Primary Examiner.*

J. J. GILL, *Assistant Examiner.*